United States Patent
Husemann et al.

(10) Patent No.: US 7,144,604 B2
(45) Date of Patent: Dec. 5, 2006

(54) METHOD FOR CROSS-LINKING POLYACRYLATES

(75) Inventors: Marc Husemann, Hamburg (DE); Stephan Zöllner, Hamburg (DE); Kai Tom Wörden, Harsefeld (DE)

(73) Assignee: tesa AG, Hamburg (DE)

( * ) Notice: Subject to any disclaimer, the term of this patent is extended or adjusted under 35 U.S.C. 154(b) by 0 days.

(21) Appl. No.: 10/363,794

(22) PCT Filed: Aug. 18, 2001

(86) PCT No.: PCT/EP01/09555

§ 371 (c)(1),
(2), (4) Date: Jun. 23, 2003

(87) PCT Pub. No.: WO02/20647

PCT Pub. Date: Mar. 14, 2002

(65) Prior Publication Data

US 2004/0054081 A1    Mar. 18, 2004

(30) Foreign Application Priority Data

Sep. 8, 2000   (DE) ................... 100 44 374

(51) Int. Cl.
| C08J 3/24 | (2006.01) |
| C08J 3/28 | (2006.01) |
| C09J 133/14 | (2006.01) |
| C09J 7/02 | (2006.01) |

(52) U.S. Cl. .................... 427/510; 522/129; 522/31
(58) Field of Classification Search ............ 522/31, 522/129; 427/520
See application file for complete search history.

(56) References Cited

U.S. PATENT DOCUMENTS

| 4,286,047 A | * | 8/1981 | Bennett et al. ............ 522/31 |
| 4,717,605 A | | 1/1988 | Urban et al. ................ 428/1 |
| 5,096,936 A | * | 3/1992 | Seko et al. ................. 522/31 |
| 5,521,227 A | * | 5/1996 | Palazzotto et al. .......... 522/4 |
| 5,721,289 A | * | 2/1998 | Karim et al. ............... 522/31 |
| 5,776,290 A | | 7/1998 | Follett et al. .............. 156/279 |
| 5,877,261 A | | 3/1999 | Harder ...................... 525/123 |
| 5,942,578 A | * | 8/1999 | Noguchi et al. ............ 525/228 |
| 6,211,261 B1 | * | 4/2001 | Hosokawa et al. .......... 522/36 |
| 6,703,073 B1 | * | 3/2004 | Husemann et al. ....... 427/208.4 |
| 6,831,114 B1 | * | 12/2004 | Husemann et al. ......... 522/35 |
| 2001/0024764 A1 | * | 9/2001 | Husemann et al. ...... 430/270.1 |
| 2006/0052475 A1 | * | 3/2006 | Husemann et al. ......... 522/79 |

FOREIGN PATENT DOCUMENTS

| DE | 197 16 996 C1 | 6/1998 |
| DE | 198 09 672 A1 | 10/1998 |
| EP | 0 267 554 A2 | 5/1988 |
| EP | 0 752 435 A2 | 6/1996 |

OTHER PUBLICATIONS

J. A. Simms, "Expoxide-Substituted Vinyl and Acrylate Copolymers," Journal of Applied Polymer Science, vol. V, Issue No. 13, pp. 58-63 (1961), Fabrics and Finishes Department, E.I. du Pont de Nemours & Company, Inc., Experimental Station, Wilmington, Delaware.

* cited by examiner

*Primary Examiner*—Susan Berman
(74) *Attorney, Agent, or Firm*—Norris McLaughlin & Marcus PA

(57) ABSTRACT

Method for producing a polyacrylate adhesive compound by a hot-melt method in which a polyfunctional α-cleaving initiator, which is present as an oligomer, is added to the polymer to be crosslinked prior to the hot-melt method and ultraviolet crosslinking is carried out after treatment in the hot-melt method.

9 Claims, 1 Drawing Sheet

METHOD FOR CROSS-LINKING POLYACRYLATES

This is a 371 of PCT/EP01/09555 filed 18 Aug. 2001 (international filing date).

The invention relates to the crosslinking of pressure sensitively adhesive polyacrylate hotmelts with di- or polyfunctional epoxides and/or with di- or polyfunctional alcohols.

BACKGROUND OF THE INVENTION

In the field of pressure sensitive adhesive (PSA) compositions, ongoing technological developments in the coating technique mean that there is a progressive need for new developments. Within the industry, hotmelt processes with solventless coating technology are of increasing importance in the preparation of PSA compositions, since the environmental regulations are becoming ever greater and the prices of solvents continue to rise. The consequence of this is that solvents are to be eliminated as far as possible from the manufacturing process for PSA tapes. The associated introduction of the hotmelt technology is imposing ever greater requirements on the adhesive compositions. Acrylic PSA compositions in particular are the subject of very intensive investigations aimed at improvements. For high-level industrial applications, polyacrylates are preferred on account of their transparency and weathering stability. In addition to these advantages, however, these acrylic PSA compositions may also meet stringent requirements in respect of shear strength and bond strength. This profile of requirements is met by polyacrylates of high molecular weight and high polarity with subsequent efficient crosslinking. For the crosslinking there are in principle two methods available, since the thermal crosslinking of acrylic hotmelt PSAs can be realized only by circuitous routes. Electron beam crosslinking offers the advantage that crosslinking can still be carried out at relatively high adhesive application rates. The disadvantage is the inefficient crosslinking, since there are no reactive groups, such as double bonds, for example. Consequently, the quality of electron beam crosslinking of polyacrylates is always relatively poor.

UV crosslinking requires less elaborate apparatus and is therefore of advantage for industrial application. In this case, free-radical intermediates are formed which react with one another and lead to crosslinking of the PSAs.

U.S. Pat. No. 4,717,605 describes a method of adhesively bonding optical glass components. It does so using radiation-curable adhesives based on ionically polymerizable epoxy systems and ionic photoinitiators based on triarylsulfonium complex salts. These adhesives still contain at least one ethylenically unsaturated compound, which can be polymerized by free radicals in the presence of a free-radical photoinitiator.

WO 88/02879 uses a photoinitiator and an iron salt for cationic photopolymerization. That document discloses a polymerizable composition composed of a free-radically polymerizable material and a photocatalyst. The photoinitiator system is composed of π-aromatic-metal complexes of the form

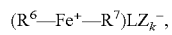

$(R^6—Fe^+—R^7)LZ_k^-,$ where $R^6$ is an $\eta^6$-aromatic, R is the anion of a cyclopentadienyl compound, L is a di- to heptavalent metal or metalloid, Z is a halogen, and k is the valence of L increased by 1. The photocatalyst system further comprises a peroxidic or hydroperoxidic compound and, optionally, a metallocene.

U.S. Pat. No. 5,776,290 claims a method of preparing a coated abrasive article, where a first binder is present on a backing and a multiplicity of abrasive particles are present in this binder. The binder is composed of a pressure sensitive hotmelt adhesive film. This hotmelt adhesive is cured by means of an energy source so that the abrasive particles are covered by a crosslinked coat of the adhesive. The hotmelt adhesive crosslinked with an epoxide in this document is based on pressure sensitively adhesive polyesters.

The UV-initiated epoxide crosslinking reaction, as a highly efficient crosslinking reaction, has not been successfully transferred to date to polyacrylate PSAs.

It is an object of the invention to provide a process for crosslinking polyacrylates, especially polyacrylate-based hotmelt adhesives, which does not have the disadvantages of the prior art and which advantageously extends the state of the art.

SUMMARY OF THE INVENTION

This object is achieved by a process for crosslinking polyacrylates in accordance with the main claim. It has been found, surprisingly and completely unexpectedly for the skilled worker, that polyacrylates can be crosslinked outstandingly by UV-initiated epoxide crosslinking and in terms of shear strength have advantages over conventional crosslinking mechanisms, especially electron beam crosslinking, if they have been functionalized with appropriate groups during polymerization. The subclaims relate to advantageous developments of the invention. A second independent claim relates to the use of difunctional or polyfunctional oxygen compounds, especially difunctional or polyfunctional epoxides or alcohols, as crosslinking reagent for functionalized polyacrylates, especially functionalized acrylic hotmelt pressure sensitive adhesives.

The main claim accordingly provides a process for preparing crosslinked polyacrylates, in which an acrylate-based monomer mixture is copolymerized to produce a polymer and, after the polymerization, crosslinking of the polymer is brought about by UV radiation, with up to 10% by weight of copolymerizable monomers containing one or more epoxy groups and/or one or more hydroxyl groups being incorporated into the polymers during the copolymerization and, prior to crosslinking, at least one photocation generator and also one or more di- or polyfunctional epoxides and/or one or more di- or polyfunctional alcohols are added to the polymers.

DETAILED DESCRIPTION

Preferably, the free di- or polyfunctional epoxides and/or the free di- or polyfunctional alcohols are used such that one of these components is present in a marked excess over the other (by free epoxides or alcohols are meant here the functionalized monomers not incorporated into the polymer chain). In the case of an excess of free epoxides it is advantageous if not more than 10 mol % of hydroxyl groups are present in the form of free alcohols, based on the epoxy groups of the free epoxides; in the case of an excess of free alcohol it is favorable to choose the fraction of the epoxy groups in the form of free epoxides to be not above a fraction of 10 mol %, based on the hydroxyl groups of the free alcohol.

Where di- or polyfunctional free alcohols are present it is very preferable not to add any di- or polyfunctional free epoxides; correspondingly, where di- or polyfunctional free epoxides are present, it is very advantageous to avoid the presence of di- or polyfunctional free alcohols.

In one first advantageous embodiment of the inventive process the composition of the monomer mixture is such that the resulting polymers possess pressure sensitively adhering properties.

The polyacrylates to be crosslinked are preferably polyacrylates which have been processed and worked on prior to crosslinking in the hotmelt process.

Furthermore, the inventive process is very favorable if the composition of the monomer mixture is as follows:

a) 60 to 99.5% by weight of (meth)acrylic acid and/or (meth)acrylate esters of the following formula

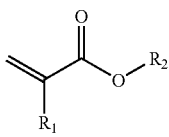

where $R^1$=H or $CH_3$ and $R^2$ is an alkyl chain having 1 to 20 carbon atoms b) 0.5 to 10% by weight of copolymerizable monomers which contain one or more epoxy groups and/or one or more hydroxyl groups, c) optionally up to a maximum of 39.5% by weight of copolymerizable olefinically unsaturated monomers containing functional groups which activate the double bond for the polymerization reaction, the components of the monomer mixture adding up to 100%, and/or if, prior to crosslinking, d) 0.01 to 25% by weight of a photocation generator and e) 0.1 to 5% by weight of one or more di- or polyfunctional epoxides and/or one or more di- or polyfunctional alcohols are added to the polymers, so that the polymers and components d) and e) add up to 100% by weight.

The concept of the invention is to copolymerize monomers having either epoxy groups and/or hydroxyl groups into the polyacrylates during the polymerization. In the presence of suitable crosslinkers, especially the above-described di- or polyfunctional epoxides and/or di- or polyfunctional alcohols for polyacrylates modified with epoxy groups and/or with hydroxyl groups, it is then possible by way of these functional groups to achieve crosslinking with exposure to ultraviolet radiation.

In this way it is possible to use such crosslinkers for the cationic curing or crosslinking of the functionalized polyacrylates.

In one advantageous development of the inventive process, in component a) of the monomer mixture, the radical $R^2$ represents an alkyl chain having 4 to 14 carbon atoms, preferably having 4 to 9 carbon atoms.

Specific examples of such acrylic monomers, which can be used very advantageously, are n-butyl acrylate, n-pentyl acrylate, n-hexyl acrylate, n-heptyl acrylate, n-octyl acrylate, n-nonyl acrylate, and the branched isomers thereof, such as 2-ethylhexyl acrylate, for example.

Further vinyl monomers, which can be used advantageously in combination with acrylate monomers in the sense of the component c), include vinyl esters, vinyl ethers, vinyl halides, vinylidene halides, and nitriles of ethylenically unsaturated hydrocarbons. Specific examples are vinyl acetate, N-vinylformamide, vinylpyridine, acrylamides, ethyl vinyl ether, vinyl chloride, vinylidene chloride, acrylonitrile, maleic anhydride, and styrene.

The monomers are preferably chosen so that the polymer prepared has adhesive properties in accordance with the Handbook of Pressure-Sensitive Adhesives, p. 172, § 1, 1989.

For the crosslinking reaction presented, the photocation initiators familiar to the skilled worker are used, preferably one of the initiators from the group presented below.

As photocation generators ("photoinitiators") it is preferred to employ aryldiazonium salts ("onium salts") which can be represented generally by the formula Ar—N=N$^+$ LX$^-$, LX$^-$ being an adduct of a Lewis acid L and a Lewis base X$^-$. Particularly advantageous for LX$^-$ are $BF_4^-$, $SbF_5^-$, $AsF_5^-$, $PF_5^-$, $SO_3CF_2^-$. Under the influence of UV radiation there is a rapid cleavage of the molecule into the aryl halide (ArX), nitrogen, and the corresponding Lewis acid.

Additionally, aryliodonium salts $(C_6H_5)RI^+ LX^-$, where R is an organic radical, especially diaryliodonium salts $(C_6H_5)_2 I^+ LX^-$, and also triarylsulfonium salts $(C_6H_5)_3S^+ LX^-$, are known for use as cationic photoinitiators. In the presence of proton donors these salts form strong (Brönsted) acids, which are likewise highly suitable for the initiation of cationic polymerizations and for the inventive process.

Sulfonium salts as cation photoinitiators are present, for example, also in the form of the compounds $H_5C_6$—CO—$CH_2$—$S^+$ LX$^-$ or $H_5C_6$—CO—$CH_2$-Pyr$^+$ LX$^-$, with Pyr representing a nitrogen-containing heteroaromatic system (e.g., pyridine, pyrimidine).

In one very advantageous embodiment of the inventive process the photocation generator chosen is a triarylsulfonium hexafluoro salt from group 15 of the periodic system, preferably such that the element from group 15 is present in the IV oxidation state. Use is made very favorably of triarylsulfonium hexafluorophosphate and/or triarylsulfonium hexafluoroantimonate.

In one very advantageous development of the inventive process a structuring of the crosslinked polyacrylates is achieved in the course of crosslinking by covering the polyacrylates to be crosslinked with a mask having regions of different UV transparency. In this case, irradiation is carried out with ultraviolet light such that certain regions of the polymer mixture are subject to different intensities of radiation. The structuring of the polyacrylates consists in regions of high crosslinking being present alongside regions of low crosslinking and/or noncrosslinked regions within the polyacrylates.

Also claimed is the use of di- or polyfunctional oxygen compounds, especially di- or polyfunctional epoxides or alcohols, as crosslinking reagents for the crosslinking reaction, brought about by ultraviolet radiation in the presence of a photocation generator, of polyacrylates functionalized by epoxy groups and/or by hydroxyl groups.

The basic principles of the invention are set out below. The polymers for crosslinking are prepared from the monomer mixture by free-radical polymerization such that their molecular weight lies within the order of magnitude of 250,000–1,000,000 g/mol.

The free-radical polymerization may be conducted in the presence of one or more organic solvents and/or in the presence of water or without any solvent. It is preferred to use as little solvent as possible. Depending on conversion rate and temperature, the polymerization time is between 6 and 48 h.

In the case of solution polymerization, solvents used are preferably esters of saturated carboxylic acids (such as ethyl acetate), aliphatic hydrocarbons (such as n-hexane or n-heptane), ketones (such as acetone or methyl ethyl ketone), special boiling point spirit, or mixtures of these solvents. As polymerization initiators use is made of customary free-radical-forming compounds, such as peroxides and azo compounds, for example. Initiator mixtures as well can be used. In the polymerization it is further possible to use thiols as regulators for lowering the molecular weight and reducing the polydispersity. As what are known as polymerization regulators it is possible to use, for example, alcohols and ethers.

In one very favorable procedure, after the polymerization, the PSA is coated from solution onto a backing material. In one very preferred variant the polymerization medium is removed under reduced pressure, this operation being carried out at elevated temperatures, in the range from 80 to 150° C., for example. The polymers can then be used and coated in the solvent-free state, in particular as hotmelt PSAs. For selected applications it is also of advantage to prepare and process the polymers without any solvent.

The blends described in this invention can be modified further in order to achieve the optimum technical adhesive properties.

By way of example, the polymers for preparing PSAs are optionally blended with one or more resins. Examples of resins which can be used include terpene resins, terpene-phenolic resins, $C_5$ and $C_9$ hydrocarbon resins, pinene resins, indene resins, and rosins, alone and also in combination with one another, and also their disproportionated, hydrogenated, polymerized, and esterified derivatives and salts. In principle, however, it is possible to use any resins which are soluble in the corresponding polyacrylate; reference may be made in particular to all aliphatic, aromatic, and alkylaromatic hydrocarbon resins, hydrocarbon resins based on pure monomers, hydrogenated hydrocarbon resins, functional hydrocarbon resins, and natural resins.

Furthermore, it is possible to add various fillers (for example, carbon black, $TiO_2$, solid or hollow beads of glass or other materials, nucleators), blowing agents, compounding agents and/or aging inhibitors.

In one particular advantageous development, plasticizers are admixed in order to improve the flow behavior of the PSA.

A development which makes the process of the invention particularly advantageous for the preparation of, for example, adhesive tapes is distinguished by the further processing of the PSA from the melt.

As backing material, for adhesive tapes for example, it is possible to use the materials which are customary and familiar to the skilled worker, such as films (polyester, PET, PE, PP, BOPP, PVC), nonwovens, foams, wovens and woven films, and also release paper (glassine, HDPE, LDPE).

The inventive crosslinking of the polyacrylates or of the (hotmelt) PSAs takes place by brief UV irradiation in the range from 200 to 400 nm using commercially customary high-pressure or medium-pressure mercury lamps with an output of, for example, 80 to 200 W/cm. It may be appropriate to adapt the lamp output to the belt speed or to run the belt slowly while shading it off partly in order to reduce the thermal load thereon. The irradiation time is guided by the construction and output of the respective lamps.

The inventive process can be utilized outstandingly to prepare structure polyacrylates, especially structured (hotmelt) PSAs. One process for preparing structured polyacrylates by structured crosslinking of polyacrylate mixtures is distinguished in that the base polymer mixture is irradiated with ultraviolet light in such a way that only certain regions of the polymer mixture are exposed to the UV radiation.

The process for preparing structured polyacrylates may be conducted in particular such that the base polymer mixture is irradiated with ultraviolet light through a perforated mask in such a way that only certain regions of the polymer mixture are exposed to the UV radiation.

Alternatively, the structuring of the polymer mixture for curing may be achieved by using, rather than the perforated mask, a film whose two-dimensional extent has regions of different UV transparency, so that certain regions of the polymer mixture are exposed to different intensities of the UV radiation.

BRIEF DESCRIPTION OF THE DRAWING

In FIG. 1, the principle of selective irradiation is illustrated by a diagram. In the figure, the irradiation of the acrylate composition (2) through a perforated mask (1) is shown, the acrylate composition (2) being present on the backing (3). In accordance with the main claim, the acrylate composition (1) is admixed with a photocation initiator which initiates the crosslinking reaction as a result of UV light (4). The ultraviolet rays (4) are able to penetrate the mask (1) only in the region of the perforations (11), so that after irradiation the situation depicted in the bottom part of the diagram results: the pressure sensitive adhesive (2) has hard segments of high crosslinking (21) alongside non-crosslinked segments (22).

Figure 1:
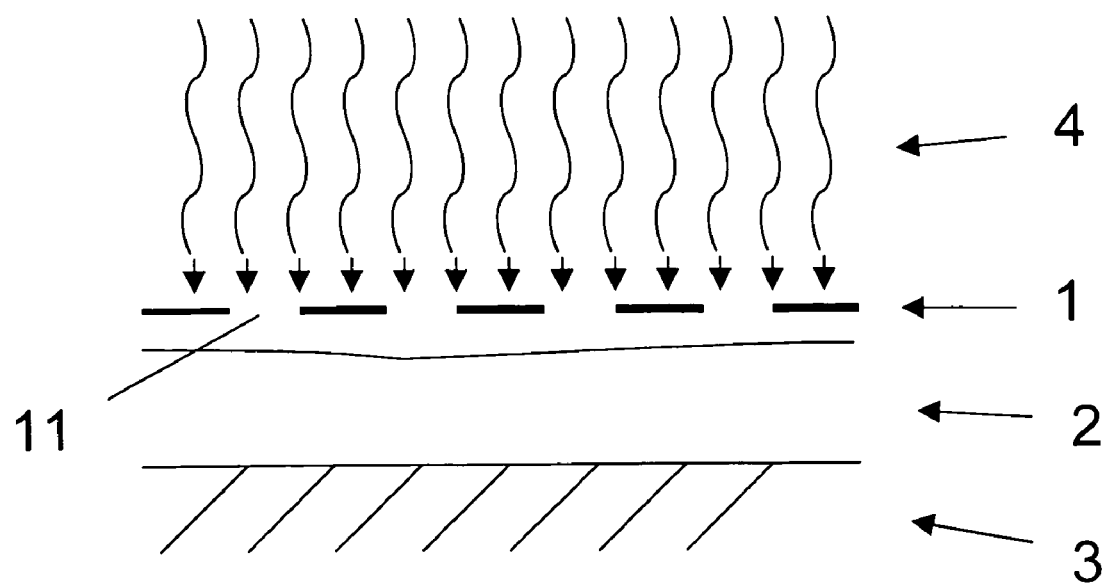
FIG. 1 illustrates the principle of selective irradiation

The polymer chains at the margins of the hard regions extend into the soft regions; accordingly, the hard regions, which are inherently of high viscosity, are linked with the soft regions and so hinder these regions in their mobility, so that the structural strength of the adhesive is increased. Moreover, these hard segments increase the cohesion of the pressure sensitive adhesive. In contrast, the soft segments facilitate the flow of the adhesive on the substrate and so increase the bond strength and the tack. A great influence on the technical adhesive properties is exerted by the percentage fraction of the irradiated surface area, and also by the size of the segments generated.

EXAMPLES

The following exemplary experiments are intended to illustrate the content of the invention, without wishing to restrict the invention unnecessarily through the choice of the examples.

Test Methods

The polyacrylate compositions and their crosslinked products were characterized using the test methods described below:

Shear Strength (Test A1, A2)

A 13 mm wide strip of the adhesive tape was applied to a smooth and cleaned steel surface. The application area was 20 mm×13 mm (length×width). The subsequent procedure was as follows:

Test A1: At room temperature, a 1 kg weight was fastened to the adhesive tape and the time which elapsed until the weight fell off was measured.

Test A2: At 70° C., a 1 kg weight was fastened to the adhesive tape and the time which elapsed until the weight fell off was measured.

The measured shear stability times are each reported in minutes, and correspond to the average of three measurements.

180° Bond Strength Test (Test B)

A 20 mm wide strip of an acrylic PSA coated onto a polyester was applied to steel plates. The PSA strip was pressed onto the substrate twice using a 2 kg weight. The adhesive tape was then peeled immediately from the substrate at 300 mm/min and at an angle of 180°. The steel plates were washed twice with acetone and once with isopropanol. For the measurements on the PE substrate, only new plates were used. The results are reported in N/cm and are averaged from three measurements. All measurements were made at room temperature under climatized conditions.

Determination of the Gel Fraction (Test C)

The carefully dried, solvent-free adhesive samples are welded into a nonwoven polyethylene (Tyvek) pouch. The gel value (weight fraction of the polymer that is not soluble in toluene) is determined from the difference in the sample weights before and after extraction with toluene.

Samples Investigated

The samples used for the experiments were prepared as follows:

The polymers were prepared conventionally by free-radical polymerization; the average molecular weight is approximately 800,000 g/mol.

Example 1

A 2 L glass reactor conventional for free-radical polymerizations was charged with 8 g of glycidyl methacrylate, 196 g of n-butyl acrylate, 196 g of 2-ethylhexyl acrylate and 266 g of acetone/isopropanol (97:3). After nitrogen gas had been passed through the reaction solution with stirring for 45 minutes, the reactor was heated to 58° C. and 0.4 g of AIBN [2,2'-azobis(2-methylbutyronitrile)] was added. Subsequently, the external heating bath was heated to 75° C. and the reaction was conducted constantly at this external temperature. After 4 and 6 h, dilution was carried out with in each case 150 g of acetone/isopropanol mixture (97:3). After a reaction time of 48 h, the polymerization was terminated and the reaction vessel was cooled to room temperature.

The product was subsequently diluted with 150 g of acetone, and 12.8 g of bisphenol A and 8 g of triarylsulfonium hexafluoroantimonate (50% strength solution in propylene carbonate; Cyracure UVI-6994® [UNION CARBIDE]) were added. The mixture was coated from solution at 50 g/m² onto an isocyanate-primed PET film and heated at 120° C. for 10 minutes. UV irradiation was carried out using a Xenon chloride lamp (VIB 308 bulb [FUSION]) with a radiation intensity of 160 W/m². After one lamp pass with a belt speed of 20 m/min, the adhesive tape specimens were further heated for 10 minutes and then tested in accordance with test methods A to C.

Example 2

The procedure of Example 1 was repeated. The polymer was subsequently diluted with 150 g of acetone, and 12.8 g of bisphenol A and 8 g of triarylsulfonium hexafluorophosphate (50% strength solution in propylene carbonate; Cyracure UVI-6990® [UNION CARBIDE]) were added. The mixture was coated from solution at 50 g/m² onto an isocyanate-primed PET film and heated at 120° C. for 10 minutes. UV irradiation was carried out using a xenon chloride lamp (VIB 308 bulb [FUSION]) with a radiation intensity of 160 W/m². After one lamp pass with a belt speed of 20 m/min, the adhesive tape specimens were further heated for 10 minutes and then tested in accordance with test methods A to C.

Example 3

The procedure of Example 1 was repeated. The polymer was coated at 50 g/m² onto an isocyanate-primed PET film, dried at 120° C. for 10 minutes, cured with electron beams (230 kV acceleration voltage, EBC unit from Crosslinking), and then subjected to technical adhesive testing using test methods A to C.

Example 4

The procedure of Example 1 was repeated. 4 g of triarylsulfonium hexafluoroantimonate (50% strength solution in propylene carbonate; Cyracure UVI-6994® [UNION CARBIDE]) were added to the blend.

Example 5

A 2 L glass reactor conventional for free-radical polymerizations was charged with 8 g of glycidyl methacrylate, 4 g of acrylic acid, 194 g of n-butyl acrylate, 194 g of 2-ethylhexyl acrylate and 266 g of acetone/isopropanol (97:3). After nitrogen gas had been passed through the reaction solution with stirring for 45 minutes, the reactor was heated to 58° C. and 0.4 g of AIBN [2,2'-azobis(2-methylbutyronitrile)] was added. Subsequently, the external heating bath was heated to 75° C. and the reaction was conducted constantly at this external temperature. After 4 and 6 h, dilution was carried out with in each case 150 g of acetone/isopropanol mixture (97:3). After a reaction time of 48 h, the polymerization was terminated and the reaction vessel was cooled to room temperature.

The product was subsequently diluted with 150 g of acetone, and 12.8 g of bisphenol A and 8 g of triarylsulfonium hexafluoroantimonate (50% strength solution in propylene carbonate; Cyracure UVI-6994® ([UNION CARBIDE]) were added. The mixture was coated from solution at 50 g/m² onto an isocyanate-primed PET film and heated at 120° C. for 10 minutes. UV irradiation was carried out using a xenon chloride lamp (VIB 308 bulb [FUSION]) with a radiation intensity of 160 W/m². After one lamp pass with a belt speed of 20 m/min, the adhesive tape specimens were further heated for 10 minutes and then tested in accordance with test methods A to C.

Example 6

A 2 L glass reactor conventional for free-radical polymerizations was charged with 8 g of glycidyl methacrylate, 4 g of acrylic acid, 20 g of methyl acrylate, 20 g of N-tertbutylacrylamide, 348 g of 2-ethylhexyl acrylate and 266 g of acetone/isopropanol (97:5). After nitrogen gas had been passed through the reaction solution with stirring for 45 minutes, the reactor was heated to 58° C. and 0.4 g of AIBN [2,2'-azobis(2-methylbutyronitrile)] was added. Subsequently, the external heating bath was heated to 75° C. and the reaction was conducted constantly at this external temperature. After 4 and 6 h, dilution was carried out with in each case 150 g of acetone/isopropanol mixture (97:5). After a reaction time of 48 h, the polymerization was terminated and the reaction vessel was cooled to room temperature. The average molecular weight is approximately 710,000 g/mol.

The product was subsequently diluted with 150 g of acetone, and 12.8 g of bisphenol A and 8 g of triarylsulfonium hexafluoroantimonate (50% strength solution in propylene carbonate; Cyracure UVI-6994 (D [UNION CAR- BIDE]) were added. The mixture was coated from solution at 50 g/m² onto an isocyanate-primed PET film and heated at 120° C. for 10 minutes. UV irradiation was carried out using a xenon chloride lamp (VIB 308 bulb [FUSION]) with a radiation intensity of 160 W/m². After one lamp pass with a belt speed of 20 m/min, the adhesive tape specimens were further heated for 10 minutes and then tested in accordance with test methods A to C.

Example 7

A 2 L glass reactor conventional for free-radical polymerizations was charged with 8 g of hydroxyethyl methacrylate, 196 g of n-butyl acrylate, 196 g of 2-ethylhexyl acrylate and 266 g of acetone/isopropanol (97:3). After nitrogen gas had been passed through the reaction solution with stirring for 45 minutes, the reactor was heated to 58° C. and 0.4 g of AIBN [2,2'-azobis(2-methylbutyronitrile)] was added. Subsequently, the external heating bath was heated to 75° C. and the reaction was conducted constantly at this external temperature. After 4 and 6 h, dilution was carried out with in each case 150 g of acetone/isopropanol mixture (97:3). After a reaction time of 48 h, the polymerization was terminated and the reaction vessel was cooled to room temperature.

The product was subsequently diluted with 150 g of acetone, and 20 g of bisepoxidized bisphenol A Rütapox 164™ (from Bakelite AG) and 8 g of triarylsulfonium hexafluoroantimonate (50% strength solution in propylene carbonate; Cyracure UVI-6994® ([UNION CARBIDE]) were added. The mixture was coated from solution at 50 g/m² onto an isocyanate-primed PET film and heated at 120° C. for 10 minutes. UV irradiation was carried out using a xenon chloride lamp (VIB 308 bulb [FUSION]) with a radiation intensity of 160 W/m. After one lamp pass with a belt speed of 20 m/min, the adhesive tape specimens were further heated for 10 minutes and then tested in accordance with test methods A to C.

Example 8

The procedure of Example 7 was repeated. The polymer was coated at 50 g/m² onto an isocyanate-primed PET film, dried at 120° C. for 10 minutes, cured with electron beams (230 kV acceleration voltage, EBC unit from Crosslinking), and then subjected to technical adhesive testing using test methods A–C.

Example 9

A 2 L glass reactor conventional for free-radical polymerizations was charged with 8 g of hydroxyethyl methacrylate, 4 g of acrylic acid, 194 g of n-butyl acrylate, 194 g of 2-ethylhexyl acrylate and 266 g of acetone/isopropanol (97:3). After nitrogen gas had been passed through the reaction solution with stirring for 45 minutes, the reactor was heated to 58° C. and 0.4 g of AIBN [2,2'-azobis(2-methylbutyronitrile)] was added. Subsequently, the external heating bath was heated to 75° C. and the reaction was conducted constantly at this external temperature. After 4 and 6 h, dilution was carried out with in each case 150 g of acetone/isopropanol mixture (97:3). After a reaction time of 48 h, the polymerization was terminated and the reaction vessel was cooled to room temperature.

The product was subsequently diluted with 150 g of acetone, and 20 g of bisepoxidized bisphenol A Rütapox 164™ (from Bakelite AG) and 8 g of triarylsulfonium hexafluoroantimonate (50% strength solution in propylene carbonate; Cyracure UVI-6994® [UNION CARBIDE]) were added. The mixture was coated from solution at 50 g/m² onto an isocyanate-primed PET film and heated at 120° C. for 10 minutes. UV irradiation was carried out using a xenon chloride lamp (VIB 308 bulb [FUSION]) with a radiation intensity of 160 W/m². After one lamp pass with a belt speed of 20 m/min, the adhesive tape specimens were further heated for 10 minutes and then tested in accordance with test methods A to C.

Example 10

A 2 L glass reactor conventional for free-radical polymerizations was charged with 8 g of hydroxyethyl methacrylate, 4 g of acrylic acid, 20 g of methyl acrylate, 20 g of N-tert-butylacrylamide, 348 g of 2-ethylhexyl acrylate and 266 g of acetone/isopropanol (97:5). After nitrogen gas had been passed through the reaction solution with stirring for 45 minutes, the reactor was heated to 58° C. and 0.4 g of AIBN [2,2'-azobis(2-methylbutyronitrile)] was added. Subsequently, the external heating bath was heated to 75° C. and the reaction was conducted constantly at this external temperature. After 4 and 6 h, dilution was carried out with in each case 150 g of acetone/isopropanol mixture (97:5). After a reaction time of 48 h, the polymerization was terminated and the reaction vessel was cooled to room temperature. The average molecular weight is approximately 686,000 g/mol.

The product was subsequently diluted with 150 g of acetone, and 20 g of bisepoxide bisphenol A Rütapox 164™ (from Bakelite AG) and 8 g of triarylsulfonium hexafluorophosphate (50% strength solution in propylene carbonate; Cyracure UVI-6990® [UNION CARBIDE]) were added. The mixture was freed from the solvent under reduced pressure and then coated at 50 g/m² from the melt at 120° C. through a slot die onto an isocyanate-primed PET film. UV irradiation was carried out using a Xenon chloride lamp (VIB 308 bulb [FUSION]) with a radiation intensity of 160 W/m². After one lamp pass with a belt speed of 20 m/min, the adhesive tape specimens were further heated for 10 minutes and then tested in accordance with test methods A to C.

Results

The results of the technical adhesive tests of Examples 1 to 3 are shown in Table 1.

TABLE 1

| Example | SST 10 N<br>[min]<br>(test A1) | SST 10 N, 70° C.<br>[min]<br>(test A2) | BS steel<br>[N/cm]<br>(test B) | Gel value<br>[%]<br>(test C) |
|---|---|---|---|---|
| 1 | +10000 | 7885 | 3.8 | 70 |
| 2 | +10000 | +10000 | 3.7 | 65 |
| 3ᵃ | 255 | 30 | 4.0 | 43 |
| 3ᵇ | 1085 | 125 | 4.0 | 63 |

ᵃirradiated with an EB dose of 40 kGy;
ᵇirradiated with an EB dose of 60 kGy
SST: Shear stability times
BS: Bond strength The investigations of Examples 1 and 2 demonstrate that with the process of the invention it is possible to prepare pressure sensitive adhesives having a very high shear strength. Both triarylsulfonium hexafluorophosphate and triarylsulfonium hexafluoroantimonate are suitable photoinitiators for epoxy crosslinking. The epoxy functions are incorporated by polymerization in the polymer chain by means of glycidyl methacrylate. For crosslinking, bisphenol A is used. Example 3 demonstrates the superiority of the crosslinking of the invention over the conventional electron beam curing. With approximately the same gel value, the shear strength of the electron-beam-crosslinked samples lies below that of Examples 1 and 2.

The results of the technical adhesive evaluations of Examples 4 to 6 are shown in Table 2.

TABLE 2

| Example | SST 10 N, [min] (test A1) | SST 10 N, 70° C. [min] (test A2) | BS steel [N/cm] (test B) | Gel value [%] (test C) |
|---|---|---|---|---|
| 4 | +10000 | +10000 | 3.6 | 69 |
| 5 | +10000 | +10000 | 3.6 | 73 |
| 6 | +10000 | +10000 | 3.5 | 70 |

SST: Shear stability times
BS: Bond strength

Examples 4 to 6 underline the universal usefulness of the crosslinking process of the invention for acrylic PSA. Thus, for example, it is even possible to use acrylic acid as a comonomer and to carry out epoxy crosslinking. Example 4 is evidence that even the photoinitiator fraction can be reduced further for efficient crosslinking. The shear strength is fully retained. It is also possible to lower the average molecular weight. Example 6 possesses an average molecular weight of approximately 700,000 g/mol and yet achieves the optimum shear strength as a result of the epoxy crosslinking of the invention.

The results of Examples 7 to 10 are summarized in Table 3 below.

TABLE 3

| Example | SST 10 N, [min] (test A1) | SST 10 N, 70° C. [min] (test A2) | BS steel [N/cm] (test B) | Gel value [%] (test C) |
|---|---|---|---|---|
| 7 | +10000 | 6590 | 3.8 | 67 |
| 8$^a$ | 345 | 55 | 4.1 | 39 |
| 8$^b$ | 1285 | 160 | 4.2 | 59 |
| 9 | +10000 | +10000 | 3.6 | 71 |
| 10 | +10000 | +10000 | 3.7 | 68 |

$^a$irradiated with an EB dose of 40 kGy;
$^b$irradiated with an EB dose of 60 kGy
SST: Shear stability times
BS: Bond strength For Examples 7, 9 and 10, the converse route was taken. By copolymerization of the hydroxyethyl methacrylate (HEMA), hydroxyl groups were incorporated randomly along the polymer chain and were then crosslinked using a difunctional epoxide with acid catalysis. Via this route as well, the crosslinking reaction of the invention proceeds with significantly greater efficiency than the electron beam curing comparison which was conducted. Moreover, here again, different comonomer compositions are tolerated. Example 10 emphasizes that compositions with a relatively high degree of regulation can be processed as hotmelts and, with the crosslinking, likewise extend into the high shear strength range.

A variant of the process which has been found particularly efficient is that wherein the epoxy-functionalized polyacrylates were reacted with hydroxy-functionalized crosslinkers (alcohols).

We claim:
1. A process for preparing crosslinked polyacrylates, in which a monomer mixture comprising (meth)acrylates is copolymerized to produce a polymer and, after the polymerization, the polymer is subjected to a hotmelt process after which crosslinking of the polymer is brought about by ultraviolet radiation, wherein 0.5 to 10% by weight of the monomer mixture of copolymerizable monomers containing one or more epoxy groups are incorporated into the polymers during the copolymerization by glycidyl methacrylate, and, prior to crosslinking, at least one photocation generator and also one or more di- or polyfunctional epoxides and/or alcohols are added.

2. The process of claim 1, wherein the monomer mixture is one which will result in polymers which are pressure sensitively adhesive.

3. The process of claim 1, wherein the composition of the monomer mixture is as follows:
a) 60 to 99.5% by weight of (meth)acrylic acid and/or (meth)acrylate esters of the following formula

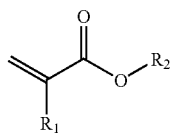

where $R^1$=H or $CH_3$ and $R^2$ is an alkyl chain having 1 to 20 carbon atoms,
b) 0.5 to 10% by weight of copolymerizable monomers which contain one or more epoxy groups and/or one or more hydroxyl groups,
c) optionally up to a maximum of 39.5% by weight of copolymerizable olefinically unsaturated monomers containing functional groups which activate the double bond for the polymerization reaction,
the components of the monomer mixture adding up to 100%,
and/or wherein, prior to crosslinking,
d) 0.01 to 25% by weight of a photocation generator and
e) 0.1 to 5% by weight of glycidyl methacrylate is added to the polymers, so that the polymers and components d) and e) add up to 100% by weight.

4. The process of claim 1, wherein a triarylsulfonium hexafluoro salt from group 15 of the periodic system is used as photocation generator.

5. The process of claim 1, wherein, in the course of crosslinking, structuring of the crosslinked polyacrylates is achieved by covering the polyacrylates to be crosslinked with a mask having regions of different ultraviolet transparency, the structuring of the polyacrylates being the presence within the polyacrylates of regions of high crosslinking alongside regions of low crosslinking and/or noncrosslinked regions.

6. A method of crosslinking by ultraviolet radiation in the presence of a photocation generator, of polyacrylates functionalized by epoxy groups, which comprises carrying out said crosslinking with di- or polyfunctional epoxides or alcohols as crosslinking reagents.

7. The process of claim 3, wherein $R_2$ is an alkyl chain having from 4 to 14 carbon atoms.

8. The process of claim 3, wherein $R_2$ is an alkyl chain having from 4 to 9 carbon atoms.

9. The process of claim 4, wherein said triarylsulfonium hexafluoro salt is selected from the group consisting of triarylsulfonium hexafluorophosphate, triarylsulfonium hexafluoroantimonate and mixtures thereof.

* * * * *